Patented June 23, 1936

2,045,090

UNITED STATES PATENT OFFICE 2,045,090

CUPRIFEROUS POLYAZO DYES AND THEIR PRODUCTION

Werner Lange, Dessau-Ziebigk in Anhalt, and Ulrich Dreyer, Wolfen, Kreis Bitterfeld, Germany, assignors to General Aniline Works, Inc., New York, N. Y., a corporation of Delaware No Drawing. Application April 30, 1934, Serial No. 723,162. In Germany May 3, 1933

16 Claims. (Cl. 260—12)

Our present invention relates to new dyes containing copper and to a process for manufacturing the same.

We have found that copper containing transformation products of azo dyes corresponding to the general formula

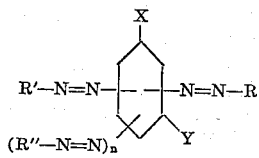

in which X and Y are OH or $NH_2$, R means a diphenylamine sulfonic acid or a substitution product thereof, R' and R'' mean radicals of diazo components of the benzene or naphthalene series and $n$ is 0 or 1, are valuable for dyeing leather, silk or wool clear, generally brown tints of good fastness to alkalies or acids.

These dyes are obtainable by coupling one molecular proportion of a 1,3-diamino-, 1,3-aminohydroxy- or 1,3-dihydroxy compound of the benzene series capable of coupling twice or thrice with a diazo compound with at least one molecular proportion of a diazotized aminodiphenylamine sulfonic acid and with one or two molecular proportions of the same or any desired diazo or diazoazo compound and by reacting the polyazo dyes thus obtained with a compound of bivalent copper. It is immaterial whether the diazotized aminodiphenylamine sulfonic acid is coupled with the azo component in the first stage of operation or after having coupled the latter with the other diazo compound or compounds.

The treatment of the dis- or polyazo dyes with the copper compound preferably is carried out in a soda alkaline or ammoniacal solution; it likewise may be performed in a neutral solution or in the presence of acetic acid. The structural formula of the copper containing dyes thus obtained, cannot be given. It is possible that when taking up copper simultaneously an oxidation or other change of the dye molecule occurs. The formation of the copper complex is accompanied with a more or less pronounced variation of the shade of the dye and with an improvement of its fastness.

The dyes thus obtained yield on chrome leather or vegetably tanned leather different brown tints corresponding to the choice of the components.

The following examples serve to illustrate our invention, the parts being by weight.

*Example 1.*—30.9 parts of 4'-nitro-4-aminodiphenylamine-2'-sulfonic acid are diazotized in the usual manner and united with an aqueous solution of 10.8 parts of 1,3-diaminobenzene. After the coupling is complete, the monoazo dye is filtered off, pressed and redissolved in 1000 parts of water and 15 parts of anhydrous sodium carbonate. After cooling to about 0° C. and addition of acetic acid, the diazo compound prepared from 17.3 parts of 1-aminobenzene-4-sulfonic acid is added and the mixture is stirred until the coupling is complete. While the alkaline solution of the monoazo dye is brick-red, the corresponding solution of the disazo dye is orange brown. The product then is heated to 80° C., an ammoniacal solution of copper oxide prepared of 55 parts of copper sulfate is added and the mixture is stirred for an hour at the said temperature. The color of the solution becomes yellow brown and simultaneously the fastness of the dye against acids is improved. While the disazo dye becomes violet brown by addition of acid, the transformed dye becomes only somewhat more greenish. The dye is separated in the usual manner by addition of salt and may be purified by redissolving it in water containing sodium carbonate. It dyes chrome leather and vegetably tanned leather olive brown tints.

When coupling instead with diazotized 1-aminobenzene-4-sulfonic acid with a second molecular proportion of 4'-nitro-4-aminodiphenylamine-2'-sulfonic acid, a dye is obtained which yields on leather a deeper olive brown.

*Example 2.*—58.8 parts of 4-amino-4'-methoxy-diphenylamine-2-sulfonic acid are diazotized in the usual manner with 13.8 parts of sodium nitrite. The diazo compound is allowed to run at about 10° C. to a solution of 10.9 parts of 1-amino-3-hydroxybenzene and 33 parts of sodium carbonate in 1000 parts of water. After having added about half the diazo compound, the rest is run into the solution simultaneously with 4 parts of sodium hydroxide in 20 parts of water. After one hour, the solution of the disazo dye is heated to 80° C. and 52 parts of copper sulfate dissolved in 200 parts of water are added, whereat the color of the solution, originally bluish-red, becomes brown. The solution is boiled for ½ hour. The dye now containing copper, is separated by addition of salt and worked up in the usual manner. It dyes chrome leather and vegetably tanned leather bluish-red-brown tints.

The transformation of the azo dye into the copper compound may likewise be carried out in the presence of acetic acid instead of sodium carbonate.

*Example 3.*—43.3 parts of the dye prepared from one molecular proportion of 4-aminoazobenzene-4'-sulfonic acid and 1 molecular proportion of 1-methyl-4-amino-2-hydroxybenzene are dissolved in 1000 parts of water and united while simultaneously adding 6 parts of sodium hydroxide dissolved in 30 parts of water with a diazo compound prepared from 30.9 parts of 4'-nitro-4 - aminodiphenylamine-2'-sulfonic acid. After coupling is complete, the solution of the dye is heated to 70° C. under addition of 22 parts of sodium carbonate and then a solution of 50 parts of copper sulfate is introduced. The mixture is heated to boiling for ½ hour. The copper oxide in excess is separated by filtration and the dye is worked up in the usual manner. It dyes leather yellowish red brown, while the dye containing no copper, dyes leather a bluish brown.

When substituting in the foregoing example the 4'-nitro-4-aminodiphenylamine - 2'- sulfonic acid by 35.4 parts of 2',4'-dinitro-4-aminodiphenylamine-3-sulfonic acid, a similar dye is obtained dyeing somewhat more yellow tints.

*Example 4.*—61.8 parts of 4'-nitro-4-aminodiphenylamine-2'-sulfonic acid are diazotized in the usual manner. The diazo compound is allowed to run simultaneously with 12 parts of sodium hydroxide dissolved in 60 parts of water at 5° C. in a solution of 11 parts of 1,3-dihydroxybenzene and 8 parts of sodium hydroxide dissolved in 1000 parts of water. After coupling is complete, the solution of the dye is heated to 50° C. and united with an ammoniacal copper oxide solution prepared from 50 parts of copper sulfate. The solution is heated to boiling and kept at this temperature for ½ hour. The copper oxide in excess is separated by filtration. The dye worked up in the usual manner dyes chrome leather and vegetably tanned leather red brown tints.

*Example 5.*—30.9 parts of 4'-nitro-4-aminodiphenylamine-2-sulfonic acid are diazotized in the usual manner and combined with 23.9 parts of 2-amino-8-hydroxy-naphthalene - 6 - sulfonic acid dissolved in 500 parts of water in the presence of 16 parts of sodium carbonate. The monoazo dye is separated by addition of salt, filtered and pressed, redissolved in 1000 parts of water and diazotized in the usual manner. The diazoazo compound is allowed to run at about 10° C. to a solution of 12.3 parts of 1-methyl-2-amino-4-hydroxybenzene, 4 parts of sodium hydroxide and 16 parts of sodium carbonate dissolved in 250 parts of water. After coupling is complete, 4 parts of sodium hydroxide dissolved in 10 parts of water, are added. Then simultaneously a solution of 6 parts of sodium hydroxide dissolved in 100 parts of water and the diazo compound prepared from 30.9 parts of 4'-nitro-4-amino-diphenylamine-2'-sulfonic acid is allowed to run to the solution. The mixture is stirred until no further diazo compound can be detected. Then the reaction product is heated to about 50° C. and after addition of 50 parts of crystallized copper sulfate, the whole is boiled for ½ hour. After addition of 11 parts of sodium carbonate, the dye solution is filtered and worked up as usual. The dye thus obtained dyes leather a dark red brown.

*Example 6.*—92.7 parts of 4'-nitro-4-aminodiphenylamine-2'-sulfonic acid are diazotized in the usual manner and united in the presence of sodium carbonate in excess with a solution of 10.9 parts of 3-amino-1-hydroxybenzene. The coupling under formation of a trisazo dye is finished in a short time. Then the solution is heated to 80° C. and a solution of 55 parts of crystallized copper sulfate containing ammonia in excess, is added. The mixture is kept for one hour at 80° C. The color of the solution, originally orange brown, becomes coffee brown by this treatment. The dye is worked up in the usual manner. It dyes chrome leather and vegetably tanned leather beautiful brown tints. The same dye is obtainable when adding to the solution of the trisazo dye alkaline by the presence of soda, a solution of copper sulfate and by stirring for some hours at about 70 to 80° C.

*Example 7.*—92.7 parts of 4'-nitro-4-aminodiphenylamine-2'-sulfonic acid are diazotized and united with a solution of 11 parts of 1,3-dihydroxybenzene in the presence of sodium carbonate in excess. The formation of the trisazo dye is finished in a short time. Then the whole is heated to 80° C. and a solution of 55 parts of crystallized copper sulfate and ammonia in excess is added and the mixture is stirred for one hour at 80° C. The color of the solution, originally orange brown, becomes yellowish brown. After filtration, the dye is worked up in the usual manner. It dyes chrome leather and vegetably tanned leather beautiful brown tints.

*Example 8.*—43.6 parts of 4-nitro-1-aminobenzene-2-sulfonic acid are diazotized and united with 10.9 parts of 3-amino-1-hydroxybenzene in the presence of sodium carbonate. Then the diazo compound prepared from 30.9 parts of 4'-nitro-4-aminodiphenylamine-2'-sulfonic acid is introduced simultaneously with addition of sodium hydroxide, so that the reaction mixture remains alkaline. Stirring is continued for some hours. While the diluted solution of the disazo dye is Bordeaux, that of the trisazo dye is brown. The solution of the trisazo dye is heated to about 80° C., a solution of 55 parts of crystallized copper sulfate containing ammonia in excess is added and the whole is heated to 80° for one hour. The color of the solution becomes yellow brown. After filtration, the dye is separated by addition of salt. It dyes chrome leather and vegetably tanned leather Havana brown tints.

*Example 9.*—9.3 parts of aminobenzene are diazotized and stirred together with a solution of 11 parts of 1,3-dihydroxybenzene while adding in the course of one hour a solution of sodium carbonate for neutralizing the acid whereby the formation of the monoazo dye is finished. The dye then is dissolved by addition of 10 parts of sodium hydroxide, 35 parts of sodium carbonate are added and a trisazo dye is formed by running into the solution the diazo compound prepared from 61.8 parts of 4'-nitro-4-aminodiphenylamine-2'-sulfonic acid. The coupling is finished immediately after the introduction of the diazo compound. The color of the solution, originally yellow, becomes orange-brown. Then the solution is heated to 80° C. and a solution of 55 parts of copper sulfate containing ammonia in excess, is added and the mixture is stirred at this temperature for one hour. The color of the solution thus becomes yellow-brown. After filtration the dye is separated by addition of salt. It dyes chrome leather and vegetably tanned leather red brown tints.

*Example 10.*—9.3 parts of aminobenzene are coupled as indicated in Example 9 with 11 parts of 1,3-dihydroxybenzene. The monoazo dye is dissolved by addition of about 10 parts of sodium hydroxide, 15 parts of sodium carbonate are added and then the diazo compound prepared from 17.3 parts of 1-aminobenzene-4-sulfonic acid is introduced. The formation of the disazo dye occurs spontaneously. The color of the solution, originally yellow, becomes orange brown. Then a further quantity of 20 parts of sodium carbonate is added and the solution of the diazo compound prepared from 30.9 parts of 4'-nitro-4-aminodiphenylamine-2'-sulfonic acid is allowed to run to the solution. The trisazo dye formed likewise is orange brown, it shows, however, a modified action against acids and alkalies. The solution is heated to about 80° C. A solution of 55 parts of crystallized copper sulfate containing ammonia in excess, is run in. One stirs at a temperature of 80° C. for an hour, whereat the color of the solution becomes yellowish brown. After filtration, the dye is worked up as usual. It dyes chrome leather and vegetably tanned leather brown tints.

It is obvious that our invention is not limited to the foregoing examples or to the specific details given therein. Thus, for instance, other aminodiphenylamine sulfonic acids, such as 4-aminodiphenylamine-2-sulfonic acid, 4-amino-4'-methyldiphenylamine-2-sulfonic acid, 4-amino-4',6'-dinitrodiphenylamine-2'-sulfonic acid, 4-amino - 4' - acetaminodiphenylamine - 2 - sulfonic acid, 4-amino-2'-methoxydiphenylamine-2-sulfonic acid or similar compounds may be used as diazo component. The second, if desired, the third diazo component which are to be coupled with the meta-disubstituted benzene derivatives capable of coupling twice or thrice, may be chosen of the great number of the known amines of the benzene or naphthalene series.

All these possibilities are within the scope of our invention and of the claims following hereafter.

What we claim is:—

1. The process which comprises heating in an aqueous solution with a cupric compound of the group consisting of cupric hydroxide, cupric carbonate, cupric acetate and cupric ammonium compounds the alkali metal salts of a polyazo dye of the general formula

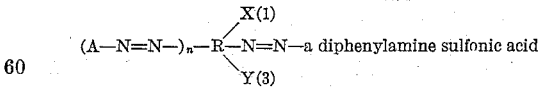

wherein R is a radicle of the benzene series, wherein X and Y mean OH or NH2, A is the radicle of a diazo component of the benzene or naphthalene series and n means 1 or 2.

2. The process which comprises heating in an aqueous solution with a cupric compound of the group consisting of cupric hydroxide, cupric carbonate, cupric acetate and cupric ammonium compounds the alkali metal salts of a polyazo dye of the general formula

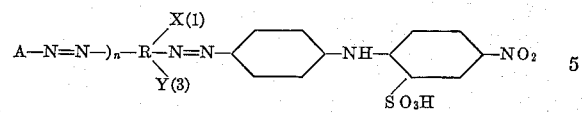

wherein R is a radicle of the benzene series, wherein X and Y mean OH or NH2, A is the radicle of a diazo component of the benzene or naphthalene series and n means 1 or 2.

3. The process which comprises heating in an aqueous solution with a cupric compound of the group consisting of cupric hydroxide, cupric carbonate, cupric acetate and cupric ammonium compounds the alkali metal salts of a polyazo dye of the general formula

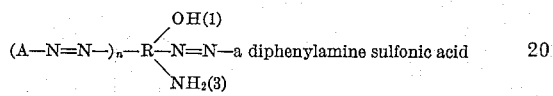

wherein R is a radicle of the benzene series, A is the radicle of a diazo component of the benzene or naphthalene series and n means 1 or 2.

4. The process which comprises heating in an aqueous solution with a cupric compound of the group consisting of cupric hydroxide, cupric carbonate, cupric acetate and cupric ammonium compounds the alkali metal salts of a polyazo dye of the general formula

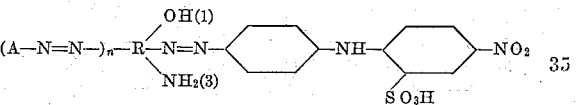

wherein R is a radicle of the benzene series, A is the radicle of a diazo component of the benzene or naphthalene series and n means 1 or 2.

5. The process which comprises heating in an aqueous solution with a cupric compound of the group consisting of cupric hydroxide, cupric carbonate, cupric acetate and cupric ammonium compounds the alkali metal salts of a polyazo dye of the general formula

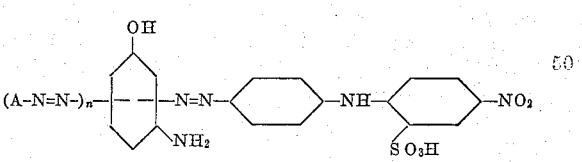

wherein A is the radicle of a diazo component of the benzene or naphthalene series and n means 1 or 2.

6. The process which comprises heating in an aqueous solution with a cupric compound of the group consisting of cupric hydroxide, cupric carbonate, cupric acetate and cupric ammonia compounds the alkali metal salts of a polyazo dye of the general formula

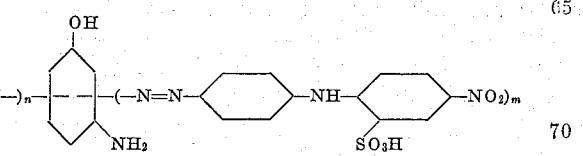

wherein n means 0, 1 or 2 and m stands for 1, 2, or 3, m+n being 2 or 3.

7. The process which comprises heating in an aqueous solution with a cupric compound of the group consisting of cupric hydroxide, cupric carbonate, cupric acetate and cupric ammonium compounds the alkali metal salts of a polyazo dye of the formula

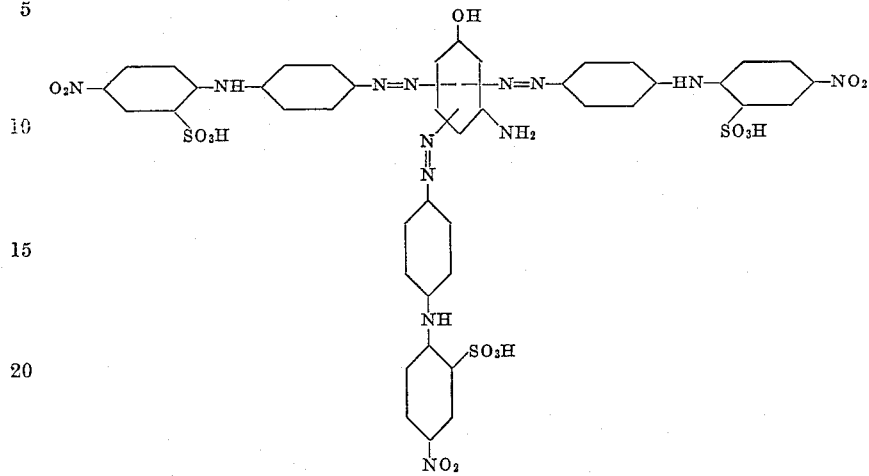

8. The process which comprises heating in an aqueous solution with a cupric compound of the group consisting of cupric hydroxide, cupric carbonate, cupric acetate and cupric ammonium compounds the alkali metal salts of a polyazo dye of the formula

9. The process which comprises heating in an aqueous solution with a cupric compound of the group consisting of cupric hydroxide, cupric carbonate, cupric acetate and cupric ammonium compounds the alkali metal salts of a polyazo dye of the formula

10. Copper containing dyes dyeing leather, silk or wool generally brown tints of good fastness to alkalies or acids, said dyes being obtainable according to the process covered by claim 1.

11. Copper containing dyes dyeing leather, silk or wool generally brown tints of good fastness to alkalies or acids, said dyes being obtainable according to the process covered by claim 2.

12. Copper containing dyes dyeing leather, silk or wool generally brown tints of good fastness to alkalies or acids, said dyes being obtainable according to the process covered by claim 3.

13. Copper containing dyes dyeing leather, silk or wool generally brown tints of good fastness to alkalies or acids, said dyes being obtainable according to the process covered by claim 6.

14. A copper containing dye dyeing leather, silk or wool generally brown tints of good fastness to alkalies or acids, said dye being obtainable according to the process covered by claim 7.

15. A copper containing dye dyeing leather, silk or wool generally brown tints of good fastness to alkalies or acids, said dye being obtainable according to the process covered by claim 8.

16. A copper containing dye dyeing leather, silk or wool generally brown tints of good fastness to alkalies or acids, said dye being obtainable according to the process covered by claim 9.

WERNER LANGE.
ULRICH DREYER.

Certificate of Correction

Patent No. 2,045,090.　　　　　　　　　　　　　　　　　　June 23, 1936.

WERNER LANGE

It is hereby certified that error appears in the printed specification of the above numbered patent requiring correction as follows: Page 4, first column, line 40, claim 8, in the formula, for the radical "$SC_3H$" read $SO_3H$; and that the said Letters Patent should be read with this correction therein that the same may conform to the record of the case in the Patent Office.

Signed and sealed this 1st day of September, A. D. 1936.

[Seal]

LESLIE FRAZER,
*Acting Commissioner of Patents.*